United States Patent
Isozaki et al.

(10) Patent No.: US 6,275,528 B1
(45) Date of Patent: *Aug. 14, 2001

(54) PICTURE ENCODING METHOD AND PICTURE ENCODING APPARATUS

(75) Inventors: Masaaki Isozaki; Atsuo Yada, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/374,134

(22) Filed: Aug. 10, 1999

Related U.S. Application Data

(63) Continuation of application No. PCT/JP98/05626, filed on Dec. 11, 1998.

(30) Foreign Application Priority Data

Dec. 12, 1997 (JP) .................................................. 9-343441

(51) Int. Cl.[7] .................................................. H04N 7/12
(52) U.S. Cl. ...................................... 375/240; 375/240.27
(58) Field of Search ................................ 348/96, 97, 415, 348/401; 375/240, 240.27

(56) References Cited

U.S. PATENT DOCUMENTS 5,461,420 * 10/1995 Yonemitsu et al. .................. 348/415
5,565,998 * 10/1996 Coombs et al. ........................ 348/97
5,691,771 * 11/1997 Oishi et al. ............................ 348/97

FOREIGN PATENT DOCUMENTS 8-265639   10/1996 (JP) .
9-168148    6/1997 (JP) .
9-284757   10/1997 (JP) .

* cited by examiner

Primary Examiner—Chris Kelley
Assistant Examiner—Allen Wong
(74) Attorney, Agent, or Firm—Frommer Lawrence & Haug, LLP.; William S. Frommer; Dennis M. Smid

(57) ABSTRACT

On the basis of encoding condition and encoding difficulty parameter of material inputted at steps S31, S32, stability of pull-down pattern is calculated at step S33. The stability of the pull-down pattern is judged at step S34. In the case where the pull-down pattern is not stable, warning is displayed at step S35. At step S36, whether or not encode processing by the original condition is continued is judged. In the case where processing is not continued, encode processing without pull-down processing, etc. is carried out at step S44. In the case where processing is continued or it is judged at step S34 that pull-down pattern is stable, scene change detection/processing, chapter boundary processing, interpolation/correction processing of encoding difficulty, calculation of No. of target bits and address calculation are carried out at steps S37 to S41. Target rate is calculated at step S42. Control file for encoder is prepared at step S43. Processing is thus completed. Thus, it is possible to provide a picture encoding method and a picture encoding apparatus which are capable of discriminating, before execution of encode processing, whether or not encode condition is suitable at the time of the 2-pass variable rate encode processing by pull-down processing.

7 Claims, 14 Drawing Sheets

| PS \ k | 0 | 1 | 2 | 3 | 4 | 5 | 6 | 7 | 8 | 9 | 10 | 11 | 12 |
|---|---|---|---|---|---|---|---|---|---|---|---|---|---|
| p_mode[k] 0 | 2 | 2 | 2 | 2 | 2 | 2 | 2 | 2 | 2 | 2 | 2 | 2 | 2 |
| p_mode[k] 1 | 2 | 3 | 4 | 0 | 0 | 0 | 0 | 0 | 0 | 0 | 0 | 0 | 0 |
| p_mode[k] 2 | 2 | 3 | 4 | 0 | 1 | 2 | 3 | 4 | 0 | 1 | 2 | 3 | 4 |
| p_mode[k] 3 | 2 | 2 | 3 | 4 | 0 | 1 | 2 | 3 | 4 | 0 | 1 | 2 | 3 | 4 |
| p_mode[k] 4 | 2 | 2 | 2 | 3 | 4 | 0 | 1 | 2 | 3 | 4 | 0 | 1 | 2 | 3 |
| p_mode[k] 5 | 2 | 2 | 2 | 2 | 3 | 4 | 0 | 1 | 2 | 3 | 4 | 0 | 1 | 2 |
| p_mode[k] 6 | 2 | 2 | 2 | 2 | 2 | 3 | 4 | 0 | 1 | 2 | 3 | 4 | 0 | 1 |

FIG.9

| MEASURED RESULT | k | 0 | 1 | 2 | 3 | 4 | 5 | 6 | 7 | 8 | 9 | 10 | 11 | 12 | pd_match | pd_errnb |
|---|---|---|---|---|---|---|---|---|---|---|---|---|---|---|---|---|
| | p_mode[k] | 2 | 3 | 4 | 0 | 1 | 2 | 3 | 4 | 0 | 1 | 2 | 3 | 4 | | |
| 0 | p_mode[k] | 2 | 2 | 2 | 2 | 2 | 2 | 2 | 2 | 2 | 2 | 2 | 2 | 2 | 4 | 3 |
| | error | 0 | 1 | 1 | 1 | 1 | 0 | 1 | 1 | 1 | 1 | 0 | 1 | 1 | | |
| 1 | p_mode[k] | 2 | 3 | 4 | 0 | 0 | 0 | 0 | 0 | 0 | 0 | 0 | 0 | 0 | 5 | 2 |
| | error | 0 | 0 | 0 | 0 | 1 | 1 | 1 | 1 | 0 | 1 | 1 | 1 | 1 | | |
| 2 | p_mode[k] | 2 | 3 | 4 | 0 | 1 | 2 | 3 | 4 | 0 | 1 | 2 | 3 | 4 | 11 | 1 |
| | error | 0 | 0 | 0 | 0 | 0 | 0 | 0 | 0 | 0 | 0 | 0 | 0 | 0 | | |
| 3 | p_mode[k] | 2 | 2 | 2 | 2 | 2 | 2 | 2 | 3 | 0 | 1 | 2 | 3 | 4 | 3 | 1 |
| | error | 0 | 1 | 1 | 1 | 1 | 1 | 1 | 1 | 1 | 1 | 1 | 1 | 1 | | |
| 4 | p_mode[k] | 2 | 2 | 2 | 2 | 2 | 2 | 2 | 2 | 0 | 1 | 0 | 1 | 2 | 1 | 1 |
| | error | 0 | 1 | 1 | 1 | 1 | 1 | 1 | 1 | 1 | 0 | 1 | 1 | 1 | | |
| 5 | p_mode[k] | 2 | 2 | 2 | 2 | 3 | 4 | 0 | 1 | 2 | 3 | 4 | 0 | 1 | 1 | 1 |
| | error | 0 | 1 | 1 | 1 | 1 | 1 | 1 | 1 | 1 | 1 | 1 | 1 | 1 | | |
| 6 | p_mode[k] | 2 | 2 | 2 | 2 | 2 | 2 | 2 | 2 | 2 | 2 | 2 | 3 | 4 | 1 | 1 |
| | error | 0 | 1 | 1 | 1 | 1 | 1 | 1 | 1 | 1 | 1 | 1 | 1 | 1 | | | total_frame=13
pd_match ratio = 84.6%
pd_match ratio = 7.7%

FIG.10

PICTURE ENCODING METHOD AND PICTURE ENCODING APPARATUS

This is a continuation of copending International Application PCT/JP98/05626 having an international filing date of Dec. 11, 1998.

TECHNICAL FIELD

This invention relates to a picture encoding method and a picture encoding apparatus adapted for encoding video material, and more particularly to a picture encoding method and a picture encoding apparatus adapted for carrying out encoding on the basis of pull-down pattern of pull-down converted input video material.

BACKGROUND ART

In encode (encoding) system for implementing compression encoding processing to video information in storing (accumulating) video information onto package media such as DVD (Digital Versatile Disk, Digital Video Disk) or Video CD, there is popularly (generally) employed an encoding method for first measuring encoding difficulty of picture of video material thereafter to carry out Bit Assign (Assignment) processing every frames of respective video information so as to fall within given number of bytes within the range of recording capacity of package media on the basis of that encoding difficulty. This encoding method will be referred to as 2-pass encoding method.

FIG. 1 shows an example of the configuration of conventional video encoding system used for the purpose of compression-encoding video information to carry out authoring of DVD, etc.

A supervisor 103 carries out management of the entirety of the video encoding system, and serves to give encoding condition to respective encoding systems such as video, audio or menu, etc. to receive notification of encode result. In this example, there are notified (informed), from the video encoder side, address "v.adr" on RAID (Redundant Arrays of Inexpensive Disks) 104 on which bit stream of encode result is written and data "vxxx.aui" necessary for multiplexing bit stream.

A main controller 111 serves to control the operation of the entirety of this video encoding system by data communication between the main controller 111 and the supervisor 103 connected through a network 102.

In more practical sense, the main controller 111 accepts control from the supervisor 103 and accepts operation by operator by management of a Graphical User Interface (GUI) section 114 and to control the operation of an encoder 112 and a Video Tape Recorder (VTR) 110 by a bit assign section 115, an encoder control section 116 and a VTR control section 117 which are caused to undergo management by the above-mentioned GUI section 114. Thus, the main controller 111 carries out encoding processing of material to be processed in accordance with encode condition notified from the supervisor 103 to notify its processing result to the supervisor 103. Further, the main controller 111 can accept setting by operator through the GUI section 114 to change (alter) detailed condition of the above-mentioned encoding.

The GUI section 114 of the main controller 111 carries out management of three programs of bit assign program "BIT_ASSIGN" of the bit assign section 115, encoder control program "CTRL_ENC" of the encoder control section 116 and VTR control program of the VTR control section 117.

Moreover, the bit assign section 115 determines, in frame units, the condition of encoding processing in accordance with file "v.enc" of the encoding condition notified from the supervisor 103 to notify control data by the above-mentioned condition to the control section 116 by file form "CTL file".

At this time, the bit assign section 115 sets bit assign (assignment) in the encoding processing to further change (alter) the set condition in accordance with operation by operator. When data-compressed video data D2 is recorded onto the RAID 104, the bit assign section 115 notifies, to the supervisor 103, data "v.adr" of address on the RAID 104 where that video data D2 is written along with information "vxxx.aui" such as data quantity, etc. necessary for multiplexing processing at the succeeding stage.

The encoder control section 116 controls the operation of the encoder 112 in accordance with control file "C.L. file" notified from the bit assign section 115. Further, the encoder control section 116 notifies, to the bit assign section 115, in frame units, data of encoding difficulty "difficulty" required for encoding processing. When video data D2 is recorded onto the RAID 104, the encoder control section 116 notifies, to the bit assign section 115, data "V.ADM." of that recording address and data "vxxx.aui" necessary for later multiplexing processing.

The VTR control section 117 controls the operation of the Video Tape Recorder (VTR) 110 in accordance with editing list notified from the supervisor 103 to reproduce desired material to be edited.

The video Tape Recorder (VTR) 110 reproduces video data D1 recorded on the magnetic tape in accordance with editing list notified from the supervisor 103 through the main controller 111 to output it to the encoder 112.

The encoder 112 switches the operation in accordance with the condition notified through the main controller 111 from the supervisor 103 to compression-encode the video data D1 outputted from the VTR 110 by the technique of MEG (Moving Picture Experts Group).

At this time, the encoder 112 notifies result of encoding processing to the main controller 111, and the main controller 111 controls the condition of encoding in that data compression to control quantity of bits generated. Thus, the main controller 111 can grasp, in frame units, quantity of bits generated by data compression.

Moreover, at the time of processing of encode condition setting in advance in the 2-pass encode operation (at the time of provisional encoding or pre-encoding), the encoder 112 merely data-compresses video data to only notify processing result to the main controller 111. On the other hand, at the time of final data compression processing (at the time of main encoding), the encoder 112 records the compression-processed video data D2 onto the RAID 104 to further notify, to the main controller 111, address where that data is recorded, data quantity, etc.

A monitor unit 113 is caused to be of configuration capable of monitoring video data D2 which has been data-compressed by the encoder 112. By this monitor unit 113, in this video encoding system, operator can carry out the so-called preview to confirm result of data compression processing as occasion demands. In addition, operator can operate the main controller 111 on the basis of this preview result to change (alter) the condition of encoding in detail.

As described above, in the DID, as compression system for video data, there is employed MEG (Moving Picture Experts Group) system.

The MEG is the system of removing redundancy in the time direction by motion compensation prediction to thereby carry out data compression, and there are used three kinds of encoded pictures of I (Intra) picture encoded only within frame, P (Predictive) picture encoded by predicting current (present) picture (frame) from past picture (frame) and B (Bidirectionally Predictive) picture encoded by current (present) picture (frame) from past picture (frame) and future picture (frame).

Moreover, these pictures are caused to be of GOP (Group of Pictures) which are set (group) necessarily including one I picture.

FIG. 2 shows an example of GOP structure.

In this example, the number N of pictures (frames) constituting one GOP is 15. The order where respective pictures of GOP are displayed is different from the order where they are encoded. The leading picture of GOP in the display order is B picture which is before I picture and next to P picture or I picture. In addition, the last picture of the GOP in the display order is the first P picture which exists before next I picture.

The 2-pass encoding operation will now be described with reference to the configuration of the video encoding system illustrated in FIG. 1.

FIG. 3 shows the fundamental processing procedure of 2-pass encoding operation in the video encoding system.

Initially, at step S51, there is given encode condition "Vance" such as total quantity of bits or maximum rate, etc. assigned to video information via the network 102 from the supervisor 103. Thus, the encoder control section 116 is set in accordance with this encode condition.

Subsequently, at step S52, the encoder control section 116 measures encoding difficulty of encode material (material to be encoded) by using the encoder 112. In this case, DC value of each pixel of material and/or motion vector quantity ME thereof are measured together. Thus, file is prepared on the basis of these measured results.

More practical measurement of encoding difficulty will be carried out below.

Video information which is encode material is reproduced by the VTR 110 from digital video cassette which is master tape.

The encoder control section 116 measures encoding difficulty of video information D1 reproduced by the VTR 110 through the encoder 112. In this instance, in encoding, the number of quantization steps is set to fixed value so that quantity of bits generated is measured. In pictures in which there are many motions (movements) and there are thus many high frequency components, quantity of bits generated is large. In still pictures or pictures in which there are many flat portions, quantity of bits generated is small. Magnitude of quantity of bits generated is caused to be encoding difficulty.

Subsequently, at step S53, the encoder control section 116 executes bit assignment calculation program "BIT_ASSIGN" within bit assign section 115 in accordance with degree of encoding difficulties of respective pictures measured at the step S52 by the encoding condition set at the step S51 to carry out assignment calculation of quantity of bits to be assigned (target quantity).

Then, at step S54, result of the bit assignment calculation is used to carry out provisional encode (pre-encode) to allow operator to judge by picture quality of output of local decoder included within the encoder 112 whether or not main encoding operation is executed.

In more practical sense, picture quality is confirmed in the Preview mode which is the mode where operator can designate arbitrary processing range without outputting bit stream by the bit assignment to the RAID 104.

Then, at step S55, picture quality evaluation is carried out. In the case where picture quality is of question (NG), the processing operation proceeds to step S56, at which such customize work for picture quality adjustment to increase bit rate of the portion of question or to adjust filter level is carried out. Thereafter, at step S57, bit assignment re-calculation is executed.

Thereafter, the processing operation returns to the step S54. At this step, the customized portion is previewed. Thus, picture quality is confirmed at the step S55. In this case, if picture qualities of all portions are satisfactory, the processing operation proceeds to step S58. By the encoder 112, there is executed encoding operation with respect to the entirety of material by bit assignment re-calculated at the step S57.

On the other hand, in the case where it is judged at the step S55 that picture quality is of no question, the processing operation proceeds to step S58 as it is. By the encoder 112, encode processing by bit assignment calculated at the step S53 is executed.

Then, at step S59, post-processing such that bit stream which is encode result is written onto the RAID 104 through SCSI (Small Computer System interface), or the like is carried out. Two 2-pass encoding processing is thus completed.

After execution of encoding processing at the step S58, the video encoder control section 116 notifies information of encode result as described above to the supervisor 103 via the network 102.

In this example, processing of respective steps except for the step S52, the step S54 and the step S58 of the respective steps of FIG. 3 are carried out by off line.

Explanation will be further given in connection with bit assignment calculation executed at the bit assign section 115 in the above-described 2-pass encoding processing.

FIGS. 4A to 4G show an example of processing of remainder bits in the bit assignment calculation.

Initially, total quantity of bits "QLTY_BYTES" (FIG. 4A) and maximum bit rate (MISREAD)" assigned to video information of recording capacity of package medium such as Digital Video Disk (DID) etc. are designated from the supervisor 103.

On the other hand, the encoder control section 116 executes bit assignment calculation program "BIT_ASSIGN" within the bit assign section 115 to first determine total number of bits "USB_BYTES" (FIG. 4B) limited so that bit rate is caused to be less than the maximum bit rate "MISREAD" (FIG. 4B) to calculate "SUPPLY_BYTES" (FIG. 4C) which is target value of sum total of the number of targets from value obtained by subtracting number of bits "TOTAL_HEADER" necessary for Header of GOP from the above-mentioned value and total number of frames of the entirety of material.

Then, assignment bit quantities (target quantities) to respective pictures are assigned so as to fall within size of the "SUPPLY_BYTES". Assuming that sum total of assignment bit quantities to all pictures is "TARGET_BYTES", value obtained by subtracting the above-mentioned "TARGET_BYTES" from target value "SUPPLY_BYTES" of sum total of the number of targets is quantity "REMAIN_BYTES" indicating remainder (Remain) in bit assignment as shown in FIGS. 4D to 4F.

In addition, as shown in FIG. 4G, sum of "TARGET_BYTES" and Header is caused to be "TARGET_OUT_BYTES".

FIG. 5 shows a more practical example of procedure of bit assignment calculation processing at the step S53 of FIG. 3.

Initially, at step S61, as previously described, total quantity of bits "QTY_BYTES" and maximum bit rate "MIS-READ" which are sent from the supervisor 3 are inputted.

Subsequently, at step S62, file of measured result of encoding difficulty (Difficulty) prepared at the step S52 of FIG. 3 is read in as it is.

Then, at step S63, point where scene changes is detected from change quantity of parameter of magnitude of DC value or motion vector quantity ME of respective pictures measured along with encoding difficulty.

It is to be noted that processing for detecting scene change point in the "Video Signal Processing Apparatus" that the applicant of this application has already disclosed in the specification and the drawings of the Japanese Patent Application No. 274094/1996 can be applied to detection/processing of scene change at the step S63. This "Video Signal Processing Apparatus" is adapted for detecting D.C. levels of respective frames of video signal to detect frame of scene change of that video signal from error value obtained by carrying out curve approximation of these D.C. levels to make clear scene change point. Namely, at the detected point where scene has changed, P picture is changed into I picture. Thus, improvement in the picture quality is realized.

Then, at step S64, CHAPTER boundary processing is carried out. At the time of chapter search at the DID reproducing apparatus, reproduced picture jumps from non-specified picture. In order that reproduced picture is not disturbed even in such a case, picture type is changed or GOP length is limited so that position of chapter is necessarily located at the leading position (portion) of GOP by this chapter boundary processing.

At step S65, interpolation/correction is carried out with respect to value of encoding difficulty (Difficulty) caused to be in correspondence with picture types such as I picture, P picture, B picture, etc. which have been changed as the result of a series of works (operations).

The reason why such an approach is employed is as follows. Since the maximum number of fields displayed at the time of decoding of 1 GOP is limited, there are instances where length of 1 GOP may be above this limit as the result of the fact that GOP structure is changed followed by change of picture type. In such a case, there is carried out GOP restriction (limiting) processing in which the P picture is changed into the I picture so that GOP length is shortened.

At step S66, the numbers of Target bits every respective pictures are calculated in accordance with encoding difficulty obtained by interpolation/correction processing at the step S65 and the number of bits "SUPPLY_BYTES" given with respect to the entirety of material to be encoded.

Then, at step S67, address (ADDRESS) of the RAID4 in writing thereon to bit stream of encode result is calculated. Thereafter, the processing operation proceeds to step S68, at which control file for encoder is prepared. Thus, the processing is completed.

By the procedure as stated above, the numbers of target bits every respective pictures are calculated in accordance with encoding difficulty (Difficulty) of material and the number of bits "SUPPLY_BYTES" given with respect to the entirety of material. Thus, control file for encoder is prepared.

Explanation is given in more detail in connection with such procedure of a series of bit assignments. Here, as an example of calculation of bit assignment, it is assumed that bit quantity is first assigned with GOP being as unit, and bit assignments corresponding encoding difficulties (Difficulty) of respective pictures within respective GOES are then carried out. In this case bit assignment quantity of GOP unit "gop_target" at the time of encoding is assigned in accordance with sum of encoding difficulties every respective GOES "gop_difficulty".

FIG. 6 shows an example of the simplest function for converting sum of encoding difficulties every GOES "gop_diff" and bit assignment quantity of GOP unit "gop_target" at the time of encoding.

In this example, there is used evaluation function expressed by form indicated below where "gop_target" is assumed to be Y and "gop_diff" is assumed to be X.

$$Y = AX + B$$

Total number of bits "USB_BYTES" limited so that bit rate is less than allowed maximum bit rate is given by the following relational expression.

$$USB\_BYTES = \min(QTY\_BYTES - MISREAD \times KT \times total\_frame\_number) \quad (1)$$

In the above relational expression,

KT=⅛ (bits)/30 (Hz) in the case of the NTSC system, and

KT=⅛ (bits)/25 (Hz) in the case of the PAL system.

Moreover, "total_frame_number" is total number of frames of material to be encoded, and min (s, t) is function for selecting smaller one of s and t. In addition, "DIFFICULTY_SUM" is sum total of encoding difficulties of all pictures.

$$SUPPLY\_BYTES = USB\_BYTES - TOTAL\_HEADER \quad (2)$$

$$DIFFICULTY\_SUM = \Sigma difficulty \quad (3)$$

$$B = GOP\_MINBYTES \quad (4)$$

$$\Sigma y = A \times \Sigma x + B \times n$$

In the above-mentioned relational expression, Σy=SUPPLY_BYTES, Σx=DIFFICULTY_SUM and n is total number of GOES. Thus, $$A = (SUPPLY\_BYTES - B \times n)/DIFFICULTY\_SUM$$

Accordingly, target quantity of each picture is given as below.

$$gop\_target = A \times gop\_diff + B \quad (5)$$

Thereafter, bit assignments corresponding to encoding difficulties of respective pictures are carried out within respective GOES. In the case where assignment of each picture within GOP is caused to be proportional to magnitude of encoding difficulty, target quantity of each picture is determined by the following relational expression.

$$target(k) = GOP\_TARGET \times difficulty(k)/GOP\_DIFF \quad (6)$$

(1≦K≦number of pictures within GOP)

Further, after such bit assignment calculation, there is set address of the RAID 4 onto which bit stream of encode result is written. Thus, control file for encoder is outputted. By carrying out encode processing by the control file prepared in this way, variable bit rate encoding corresponding to difficulty of picture of material is executed.

The outline of the 2-pass variable bit rate encoding has been described above.

Explanation will now be given in connection with pull-down (Piltdown) of cinema (film) material.

In order to convert cinema film constituted at 24 frames/sec. into television/video signal of the NTSC system constituted at 30 frames/sec., processing to periodically repeat the same field picture is carried out. Hereinafter, this processing is referred to as 2–3 pull-down conversion.

FIG. 7 shows the principle of this 2–3 pull-down conversion.

Phase of pattern of pull-down is determined at the time of conversion from film material to video material of the NTSC system. In many cases, pattern is regularly converted.

1 frame of video material consists of two fields, wherein the first field (1st field) thereof is assumed to be top field (top_field) and the second field (2nd field) is assumed to be bottom field (bottom_field). In addition, location where the same field picture is repeated is called repeat first field (repeat_first_field).

In such cinema material, if the position where the same field is repeated is known, processing is carried out at the time of encoding so that corresponding field is not encoded to enhance compression efficiency.

As combination of 2–3 pull-down patterns in encoding, there are the following four patterns.

0: bottom_field_first
1: bottom_field_first, repeat_first_field
2: top field_first
3: top field_first, repeat_first_field Here, combination of these patterns is defined as "picture mode".

In the case where encoding is carried out simultaneously with pull-down conversion, or in the case where information indicating the pull-down pattern, etc. is given, optimum encoding in which pull-down processing as described above is taken into consideration, i.e., encoding such that encoding of picture is not carried out with respect to fields repeated to output only information indicating field to be repeated can be carried out. However, in the case where such information is not given, there are instances where encoding in consideration of pull-down processing cannot be suitably carried out.

Explanation will now be given in connection with the relationship between 2–3 pull-down pattern and video frame number k from the leading portion of roll of material in accordance with the NTSC system.

Assuming that the above-described picture mode is p_mode[k] with respect to the relationship between position including top field which is not repeated and frame No. k, there exist frame numbers which do not belong to the above-mentioned picture modes of 0 to 3 also as seen from FIG. 7. Value of p_mode[k] in this case is assumed to be 4.

FIG. 8 is state transition diagram of p_mode [k] in the pull-down.

In the case where pull down patterns are regularly successive, value of p_mode[k] increases one by one in the field of remainder divided by 5 (mod 5) with increase of frame number k.

$$p\_mode[k+1] = (p\_mode[k]+1) \bmod 5 \qquad (7)$$

In the case where the pull down pattern is disturbed, only when p_mode is 0 or 2, that value can be repeated.

$$p\_mode[k+1] = (P\_mode[k]+1) \bmod 5 \qquad (8)$$

(limited to the case where p_mode[k] is 0 or 2)

In the 2-pass encoding, in carrying out measurement of encoding difficulty, pull-down pattern is automatically detected. At this time, bit assignment is carried out on the basis of the measured pull-down pattern. Thus, control file is prepared.

Further, at the time of final (last) encoding, encoding is carried out in accordance with pull-down pattern described in the control file.

However, in the automatic detection technique for pull-down pattern as described above, there are instances where pull-down pattern cannot be correctly detected in the case where material is similar to still picture as the result of the fact that detection is made in principle on the basis of each difference between top field and bottom field of current frame and frame early by one frame.

For example, when consideration is made in connection with the first (initial) portion of cinema (movie), image beginning from the first title scene fades in from black, logo of cinema company appears, and such image fades out to black. In such case, with respect to the portion where motion (movement) is small like fade in/fade out to black, precise detection of pull-down phase is difficult. As a result, there are many instances where detection is erroneously made.

Further, in the material using old unit (apparatus) using image pick-up tube as converter for carrying out conversion from film material to video material, there are instances where pull-down phase cannot be precisely detected by after-image between frames.

For the reason similar to the above, also in the material using noise reducer such that picture of early frame and picture of current frame are added to reduce random noise, there are instances where pull-down phase cannot be correctly detected.

In addition, in material such that a large number of film materials different in pull-down phase are edited, there is the possibility that pull-down phase may be detected as erroneous pull-down phase from delay of detection of pull-down pattern at the editing point.

As stated above, when encoding is carried out at erroneous phase, since processing is made by erroneous pull-down pattern for a time period until phase is locked with respect to correct phase, there is the problem that motion (movement) of picture of encoded result becomes awkward, or the like.

Whether or not there is the problem even when encoding is executed by pull-down processing greatly depends upon stability of pull-down pattern of material.

However, since it is difficult to carry out such judgment in advance, operator can only judge reasonableness while observing motion (movement) of picture after encoding. In the case where it is judged that the encoding condition is not suitable, there was the problem that the condition is changed to carry out encoding for a second time from the first.

DISCLOSURE OF THE INVENTION

This invention has been made in view of problems as described above, and its object is to provide a picture encoding method and a picture encoding apparatus which are capable of judging whether or not the encoding condition by pull-down processing is suitable before execution of encoding in the 2-pass variable rate encoding.

To solve the above-mentioned problems, a picture encoding method of this invention is directed to a 2-pass picture encoding method of implementing encoding based on pull-down pattern to input video material to which pull-down conversion has been implemented, the method including: a measurement step of measuring pull-down pattern of the input video material; and a judgment step of judging stability of the measured pull-down pattern.

In this case, it is preferable that the judgment step includes: a selection step of comparing the measured pull-down pattern and respective pull-down patterns based on assumed plural initial phases to select initial phase which provides pull-down pattern closest to the measured pull-down pattern of the respective pull-down patterns; an error calculation step of calculating error with respect to total number of frames of the video material of the pull-down pattern based on the selected initial phase; and a stability judgment step of judging, before encoding, stability of pull-down pattern based on the selected initial phase on the basis of the calculated error.

In addition, in order to solve the above-mentioned problems, a picture encoding apparatus of this invention is directed to a 2-pass picture encoding apparatus for implementing, while implementing pull-down processing to input video material to which pull down conversion has been implemented, encoding based on pull-down pattern, the apparatus including: measuring means for measuring pull-down pattern of the input video material; selector means for comparing the measured pull-down pattern and respective pull-down patterns based on assumed plural initial phases to select initial phase which provides pull down pattern closest to the measured pull-down pattern of the respective pull-down patterns; error calculating means for calculating error with respect to total number of frames of the video material of the pull-down pattern based on the selected initial phase; and stability judging means for judging, before encoding, stability of pull-down pattern based on the selected initial phase on the basis of the calculated error.

In accordance with this invention, in the 2-pass variable rate encoding processing, such an approach is employed to measure pull-down pattern of input video material to have ability to judge, before execution of encoding, whether or not encode condition by pull-down processing is suitable by stability of the measured pull-down pattern.

BRIEF DESCRIPTION OF THE DRAWINGS

FIG. 9 is a view showing initial phase of 2–3 pull-down pattern.

FIG. 10 is a view showing an example of comparison result between measured pull-down pattern and assumed pull-down patterns.

BEST MODE FOR CARRYING OUT THE INVENTION

Figure 1:
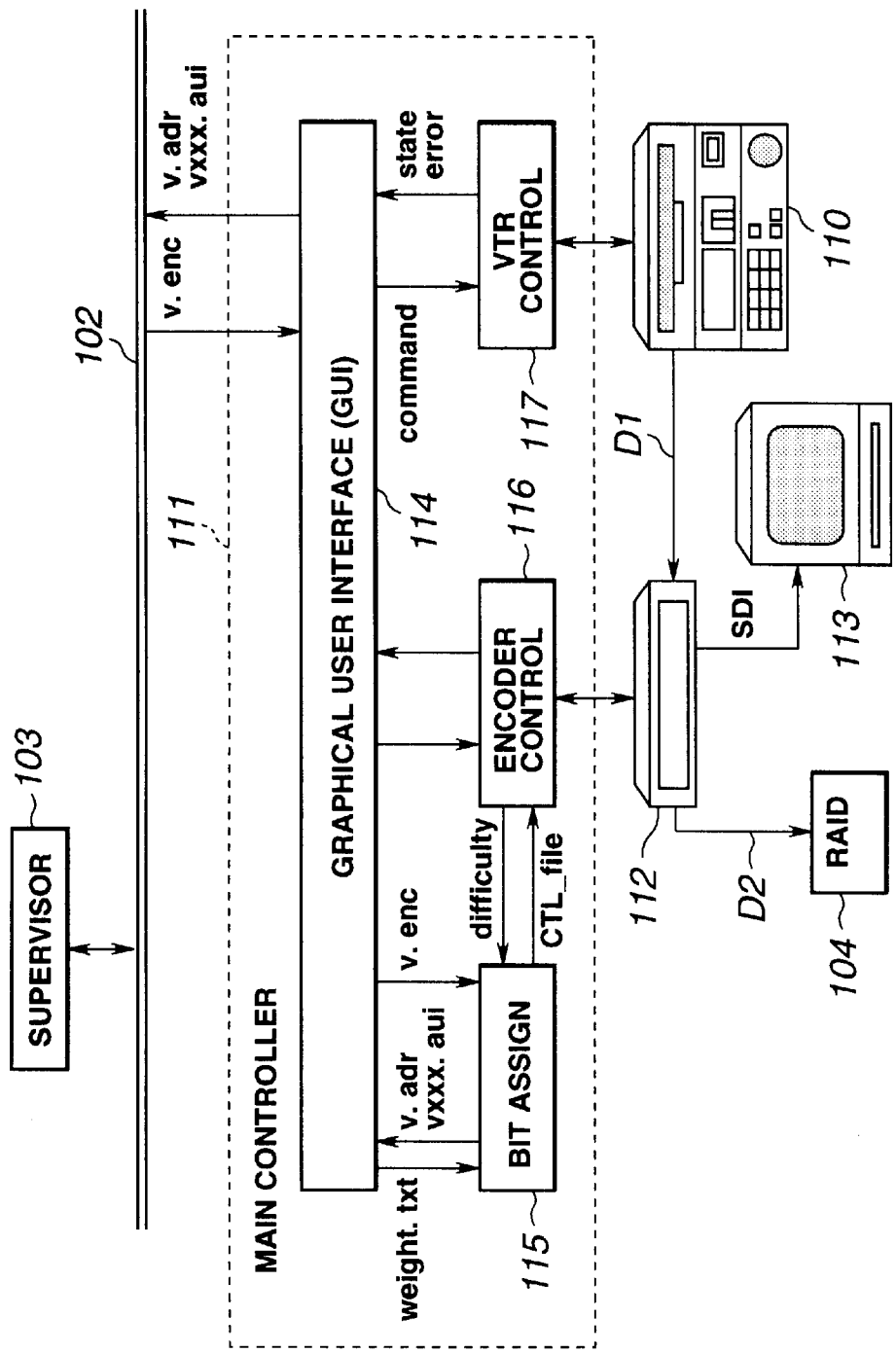
FIG. 1 is a view showing an example of the configuration of conventional video encoding system.
Figure 2:
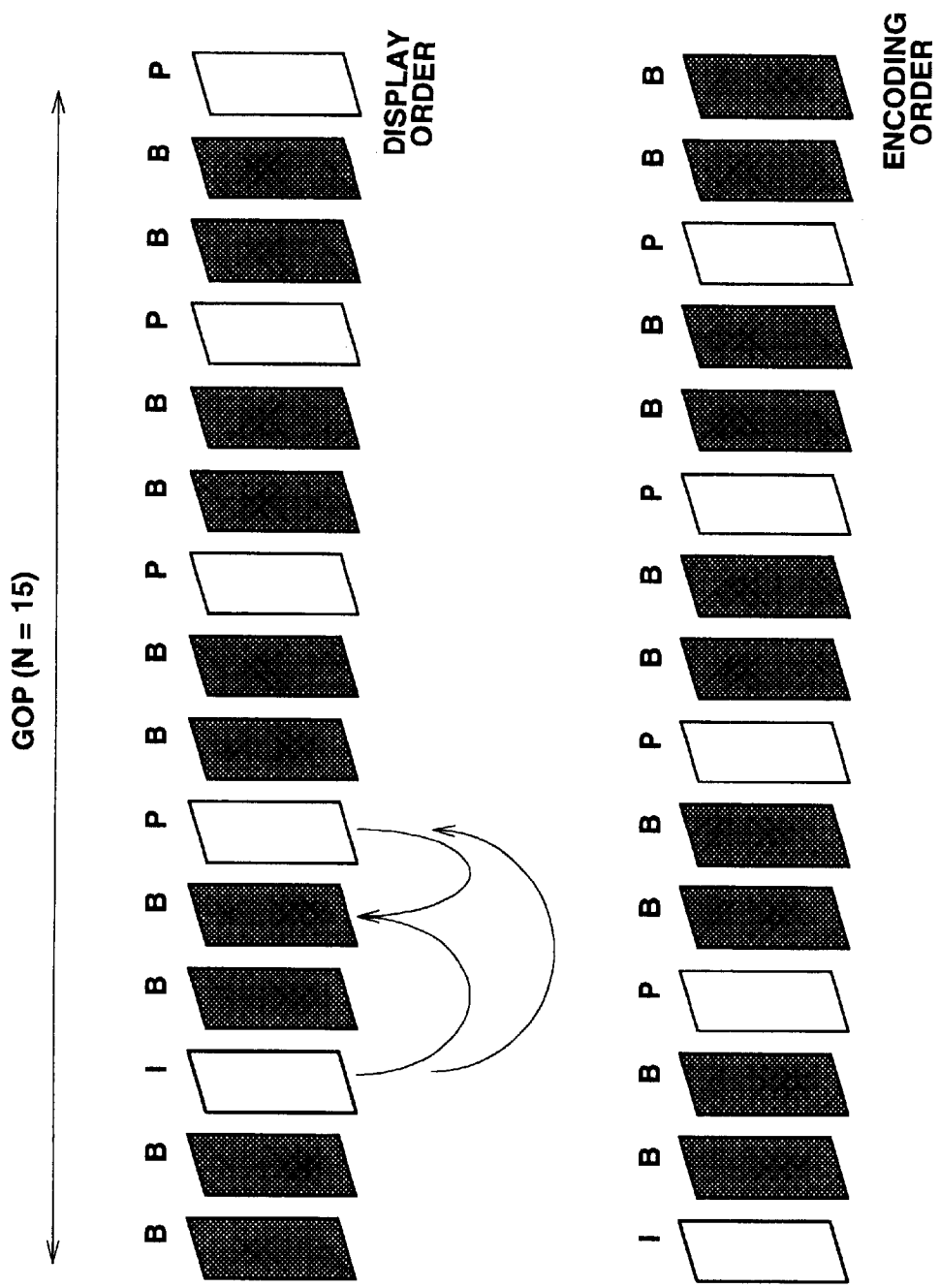
FIG. 2 is a view for explaining GOP structure.
Figure 3:
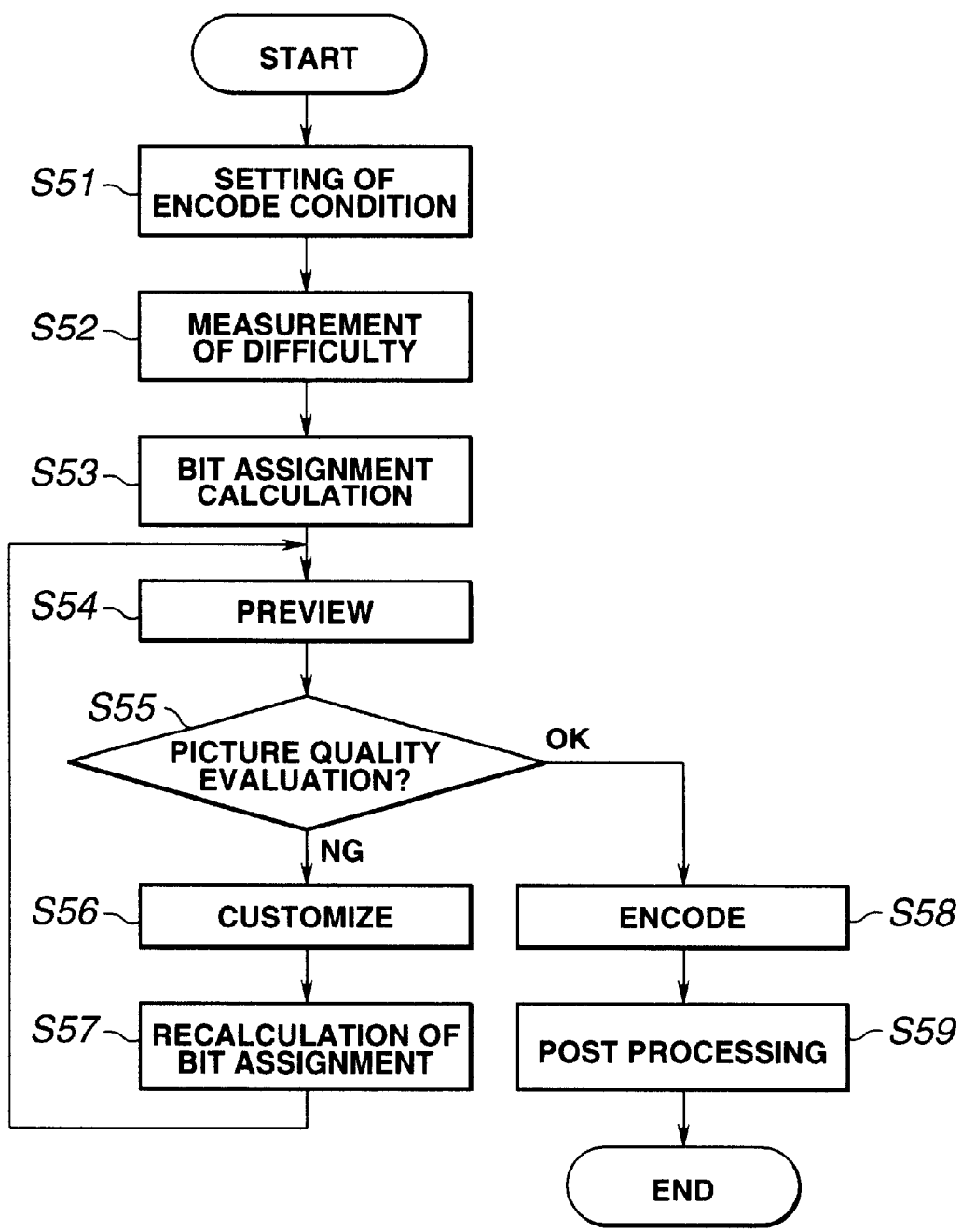
FIG. 3 is a flow chart showing fundamental processing procedure of 2-pass encoding in the conventional video encoding system.
Figure 4:
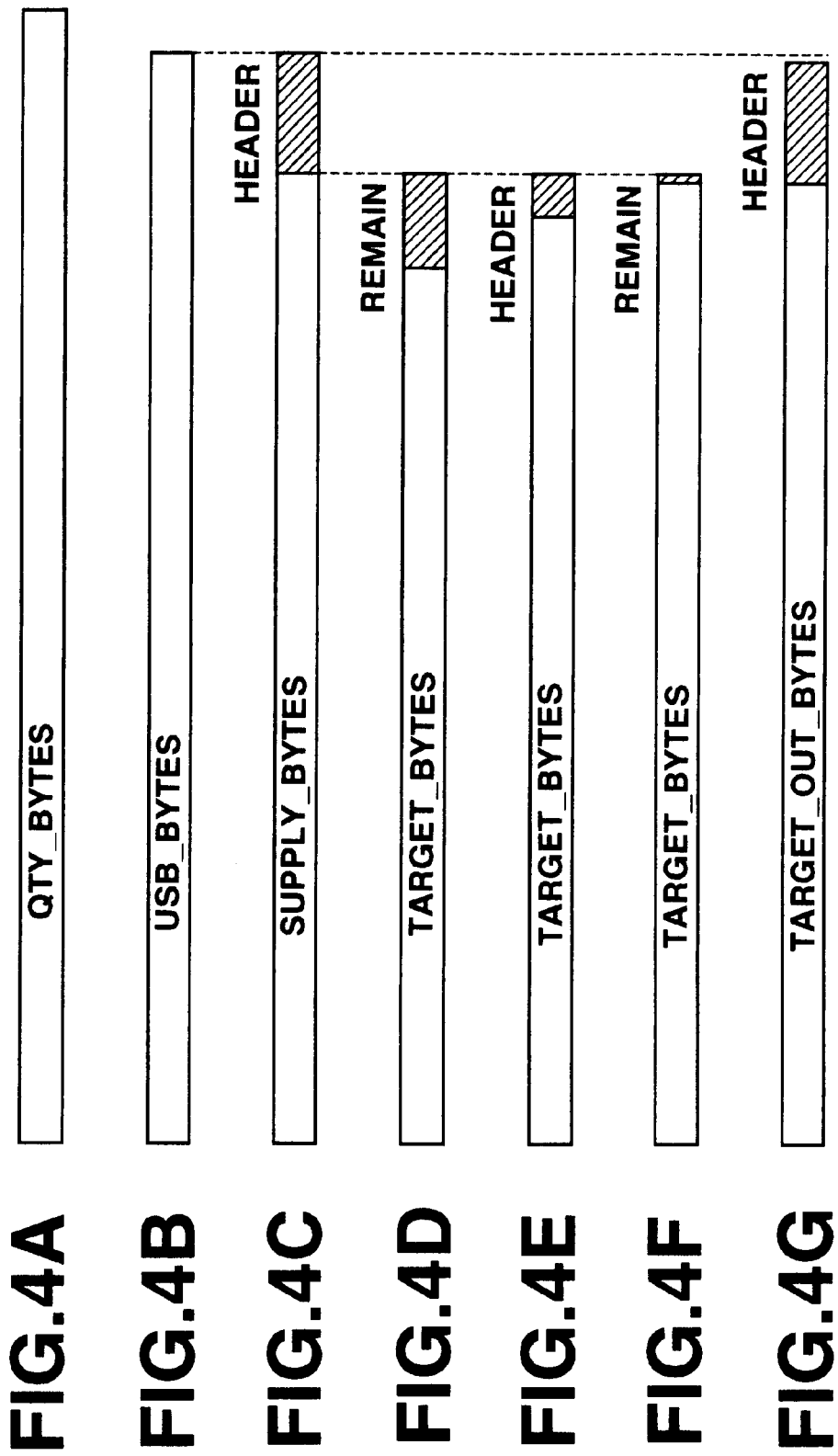
FIGS. 4A to 4G are views for explaining an example of processing of remainder bits in bit assignment calculation.

Preferred embodiment of this invention will be described below with reference to the attached drawings.

In the embodiment of this invention, in picture encoding of the 2-pass system for implementing encoding corresponding to pull-down processing to input video material, pull-down pattern of input video material is measured to judge stability of the measured pull-down pattern. This judgment of stability is realized by comparing the measured pull-down pattern and respective pull down patterns based on assumed plural initial phases to select initial phase which provides pull-down pattern closest to the measured pull-down pattern of the respective pull-down patterns to calculate error with respect to total number of frames of the video material of the pull-down pattern based on the selected initial phase to judge, before encoding, stability of the pull-down pattern based on the selected initial phase on the basis of the calculated error. On the basis of this judgment result, whether or not encoding by pull-down processing of the input video material is suitable is judged. In this case, the encoding corresponding to pull-down processing or the encoding by pull-down processing is encoding in which repetitive fields of pull-down pattern are not mainly encoded to thereby enhance encoding efficiency.

The embodiment of the picture encoding method and the picture encoding apparatus according to this invention will be described below by taking an example of encoding processing of video material to which the previously described 2–3 pull-down conversion is implemented.

FIG. 9 shows initial phase of the previously described 2–3 pull-down pattern.

2–3 pull-down in carrying out frame conversion from film material to video signal is regularly carried out in most cases. In view of this, pull-down pattern of material to be encoded is assumed to be regular.

Moreover, in consideration of the fact that it is prescribed that the first portion of material to be encoded is chapter-designated and must be encoded necessarily in the state where p_mode is 2, initial phase of pull-down pattern can be represented by any one of seven kinds of patterns shown in this figure in the case where there is no disturbance.

In these pull-down patterns of pull-down, when mode of initial phase is assumed to be p_start ($0 \leq p\_start \leq 6$), picture mode p_mode[k] of the k-Th frame is represented by the following formula.

$$Pd\_cycle[7][10] = \{\{2, 2, 2, 2, 2, 2, 2, 2, 2, 2\},$$
$$\{2, 3, 4, 0, 0, 0, 0, 0, 0, 0\},$$
$$\{2, 3, 4, 0, 1, 2, 3, 4, 0, 1\},$$
$$\{2, 2, 3, 4, 0, 1, 2, 3, 4, 0\},$$
$$\{2, 2, 2, 3, 4, 0, 1, 2, 3, 4\},$$
$$\{2, 2, 2, 2, 3, 4, 0, 1, 2, 3\},$$
$$\{2, 2, 2, 2, 2, 3, 4, 0, 1, 2\}\}$$

p_mode[k] 32 pd_cycle[pd_start][k mod 5] (when k<5)

p_mode[k]=pd_cycle[pd_start][k mod 5+5] (when k≧5)

In view of the above, in the picture encoding method of the embodiment of this invention, such an approach is employed to compare pull down patterns based on the seven kinds of initial phases assumed with respect to frame number k (0≦k≦kenned) and measured pull down pattern to select pattern (initial phase) in which error is minimum of the seven kinds of patterns (initial phases).

Flow of video encoding processing as the embodiment of such picture encoding method according to this invention will be described below.

(1) Initially, the Ps-Th pull-down pattern and measured pull down pattern are compared. When they are in correspondence with each other, pd_match[ps] is increased by 1. On the other hand, when they are not in correspondence with each other as the result of comparison, the number of points where phase deviates or shifts (rising edge of error) is counted as pd_errnb [Ps].

(2) The above-mentioned processing of the item (1) is repeated within the range of 0≦k≦kenned.

(3) The processing of the items (1) and (2) are repeated within the range of 0≦Ps≦6.

(4) Maximum value of pd_match[ps] within the range of 0≦Ps≦6 is determined.

The number of points where phase with respect to maximum Ps deviates or shifts pd_errnb[ps] is caused to be pd_error_max.

(5) Pattern matching ratio pd_match_ratio and error occurrence ratio pd_error_ratio with respect to measured total number of frames frame_nb are determined in a manner as described below.

$$pd\_error\_ratio = pd\_error\_max/frame\_nb * 100 (\%)$$

$$pd\_match\_ratio = pd\_match\_max/frame\_nb * 100 (\%)$$

(6) In the case where the pattern matching ratio pd_match_ratio is less than threshold value PD_MATCH_LIMIT, or in the case where total number of frames frame_nb is threshold value PD_FRAME_LIMIT or more and error occurrence ratio pd_error_ratio is threshold value PD_ERROR_LIMIT or more, it is judged that pull down pattern of encode material is not stable (Accordingly, there is high possibility that when pull-down processing is designated to carry out encode operation, problem may take place in picture quality) to display message indicating warning for operator.

(7) Operator looks at the above-mentioned warning to judge whether or not processing is continued under the original encode condition. In the case where processing is stopped, designation of the pull-down processing is excluded from the encode condition to carry out encode work from the first for a second time.

In the video encode operation of the embodiment according to this invention, which is carried out by procedure as described above, threshold value for judging stability of pull-down pattern of encode material is set as described below, for example.

PD_MATCH_LIMIT=75 (%)

PD_ERROR_LIMIT=0.5 (%)

PD_FRAME_LIMIT=10000 (frame)

Moreover, initial value is set in a manner as described below.

pd_match[ps]=0; (the number of times where p_mode is the same)

pd_errnb[ps]=0; (the number of times where pd_mode changes)

(0≦Ps≦6)

pd_error=pd_error_back=0;

pd_match_max=0

Measurement of pull-down pattern will now be described.

FIG. 10 shows an example of result obtained by comparing pull-down pattern of encode material measured at the time of provisional encode (pre-encode) operation with pull-down patterns based on the previously described seven kinds of initial phases.

In this figure, error is caused to be 1 in the case where measured result and pull down pattern are different. pd_match [Ps] indicates the number where error is 0, i.e., the number of times where p_node is the same. In addition, pd_error [Ps] is the same as the number of edges where error changes from 0 to 1.

In this example, it is seen that pull-down pattern based on the initial phase indicated by PS=2 is closest to measured pull-down pattern.

In this case, because total_frame=13.

the pattern matching ratio pd_match_ratio=84.5% the error occurrence ratio pd_error_ratio =7.7%

When this result is judged by using the previously described set threshold value, it is judged that the measured pull-down pattern of material is stable. As stated above, maximum one of values of pd_match with respect to measured value of pull-down pattern is selected as initial phase.

Figure 11:
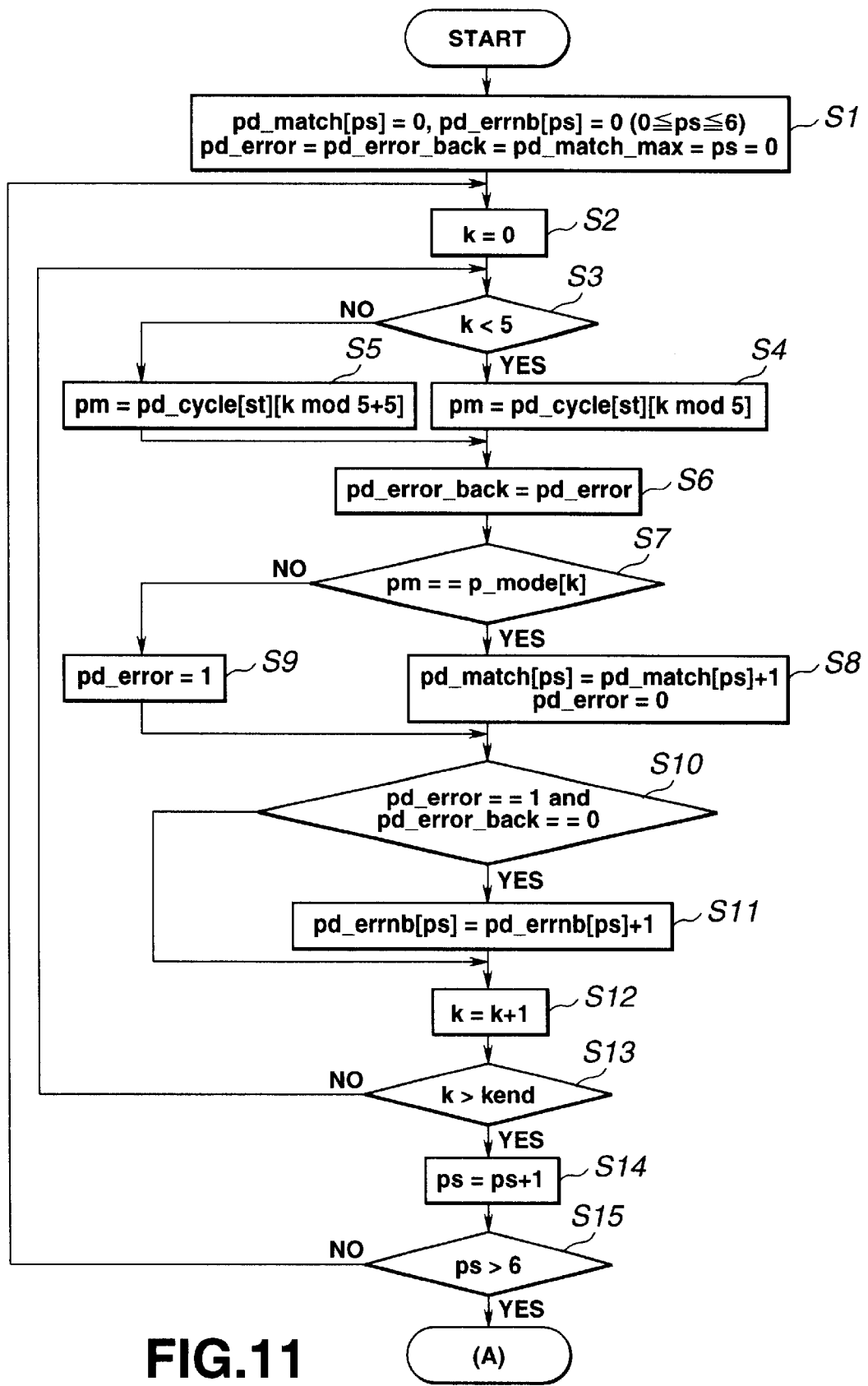
FIG. 11 is a flow chart showing an example of algorism for judging stability of pull-down pattern.
Figure 12:
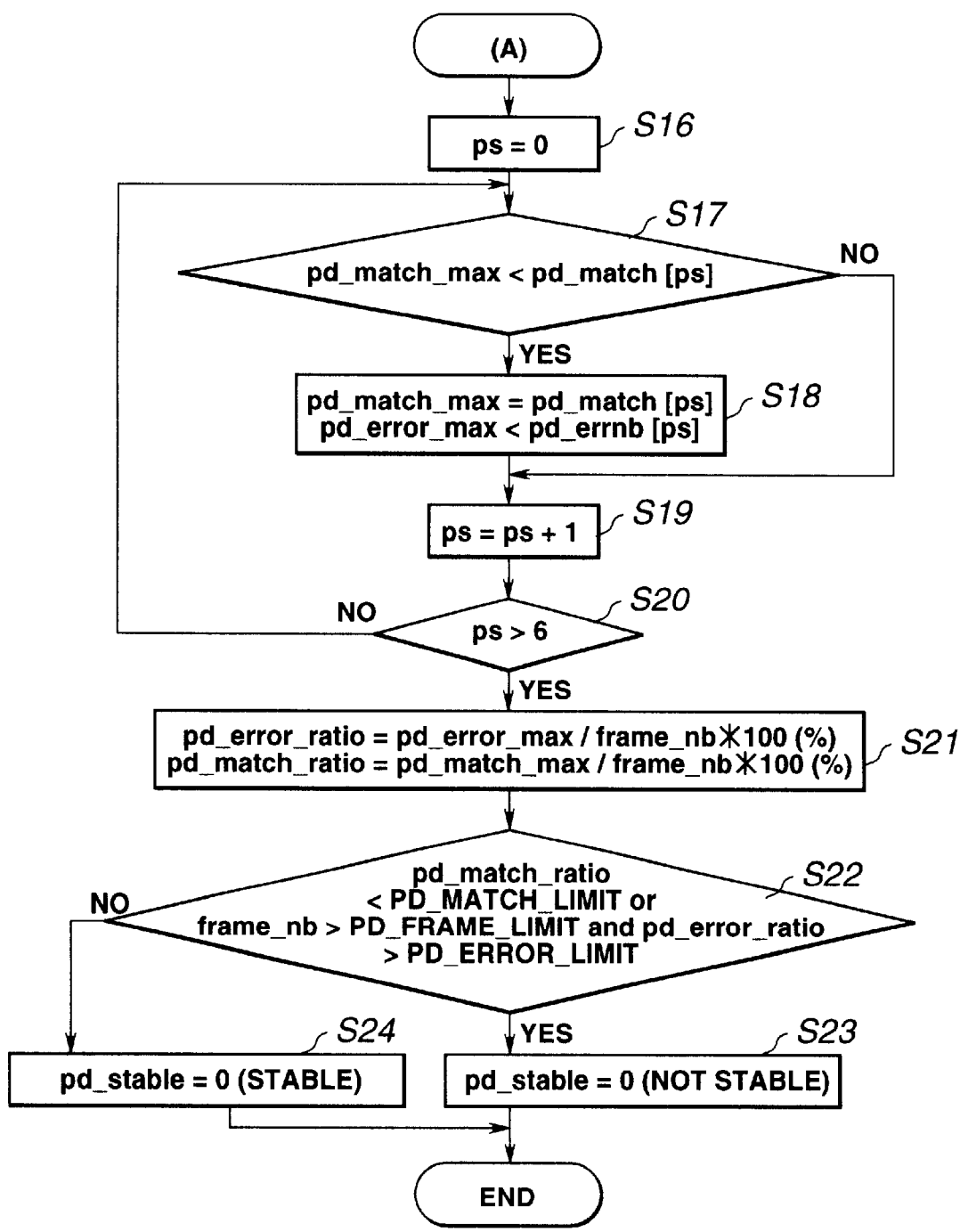
FIG. 12 is a flow chart subsequent to FIG. 11, which shows an example of algorism for judging stability of pull-down pattern.

FIGS. 11 and 12 show a more practical example of algorism for judging stability of pull-down pattern in the above-described video encode processing as the embodiment of this invention.

At step S1 of FIG. 11, the number of times where p-mode is the same pd_match [Ps] and pd_error [Ps] are initialized so that their values are both set to 0. In this case, since the initial phase of pull-down pattern indicated by Ps is limited to seven kinds of initial phase (states) as previously described, 0≦Ps≦6. In addition, values of pd_error, pd_error_back, pd_match_max and Ps are all set to 0 (zero).

Then, at step S2, value of frame number k of video is set to 0 (zero).

Then, at step S3, whether or not k<5 is judged. When k<5, the processing operation proceeds to step S4. On the other hand, when k<5 is not satisfied, the processing operation proceeds to step S5. This is because, in the initial phase of pull-down pattern shown in FIG. 9, frames up to the first four frames are singular points.

Then, at the step S4, PM=pd_cycle[st][k mod 5] is caused to hold. At the step S5, PM=pd_cycle[st][k mod 5+5] is caused to hold.

Then, at step S6, pd_error_back=pd_error is caused to hold.

Then, at step S7, whether or not PM==p madake] is judged. In the case where this condition is satisfied, the processing operation proceeds to step S8. In the case where this condition is not satisfied, the processing operation proceeds to step S9. In this case, "=" means substitution, whereas "==" means conditional judgment whether or not both sides are equal to each other in a manner similar to the case where this symbol is used in the C language, etc.

Then, at step S8, value of pd_match[ps] is incremented by 1 and value of pd_error is set to 0 (zero).

On the other hand, at step S9, value of pd_error is set to 1.

Then, at step S10, whether or not pderror==1 and pd error back==0 is judged. In the case where this condition is satisfied, the processing operation proceeds to step S11, at which value of pd_errnb[ps] is incremented by 1. On the other hand, in the case where the condition of the step S10 is not satisfied, the processing operation skips over step S11 and proceeds to step S12.

Then, at the step S12, frame number k is incremented by 1.

At step S13, whether or not frame number k is above kenned is judged. In the case where this condition is not satisfied, i.e., the processing with respect to the last frame is not yet carried out, the processing operation returns to the step S3. Thus, the above-mentioned procedure is repeated. On the other hand, in the case where this condition is satisfied, i.e., processing with respect to the last frame is already carried out, the processing operation proceeds to step S14, at which value of Ps is incremented by 1. Thus, similar processing is carried out with respect to pull-down pattern based on the next initial phase.

At step S15, whether or not Ps>6 is judged. In the case where this condition is not satisfied, i.e., in the case where processing with respect to all pull-down patterns based on the previously described seven kinds of initial phases are not completed, the processing operation returns to the step S2. Thus, the above-mentioned procedure is repeated. On the other hand, in the case where this condition is satisfied, i.e., processing are completed with respect to all pull down patterns based on the previously described seven kinds of initial phases, the processing operation proceeds to step S16 of FIG. 12, at which Ps is set to 0 (Ps=0).

At step S17, whether or not pd_match_max is smaller than pd_match[ps] is judged. In the case where this condition is satisfied, the processing operation proceeds to step S18, at which pd_match_max =pd_match[ps], pd_error_max=pd_errnb[ps] are caused to hold. On the other hand, in the case where the condition of the step S17 is not satisfied, the processing operation skips over the step S18 and proceeds to step S19.

At the step S19, value of Ps is incremented by 1. Thus, similar processing is carried out with respect to pull-down pattern based on the next initial phase.

At step S20, whether or not Ps>6, i.e., processing with respect to all pull-down patterns based on the previously described seven kinds of initial phases are completed is judged. In the case where this condition is not satisfied, the processing operation returns to the step S17. Thus, the above-mentioned procedure is repeated. On the other hand, in the case where this condition is satisfied, the processing operation proceeds to step S21, at which error occurrence ratio pd_error_ratio and pattern matching ratio pd_match_ratio are calculated.

Then, at step S22, there is judged whether or not pattern matching ratio pd_match_ratio is smaller than threshold value PD_MATCH_LIMIT or measured total number of frames frame_nb is greater than threshold value PD_FRAME_LIMIT and error occurrence ratio pd_error_ratio is greater than threshold value PD_ERROR_LIMIT. In the case where this condition is satisfied, it is judged that measured pull-down pattern is not stable. At step S23, pd_stable=0 is caused to hold. On the other hand, in the case where this condition is satisfied, it is judged that measured pull-down pattern is stable. At step S24, pd_stable=1 is caused to hold.

Figure 13:
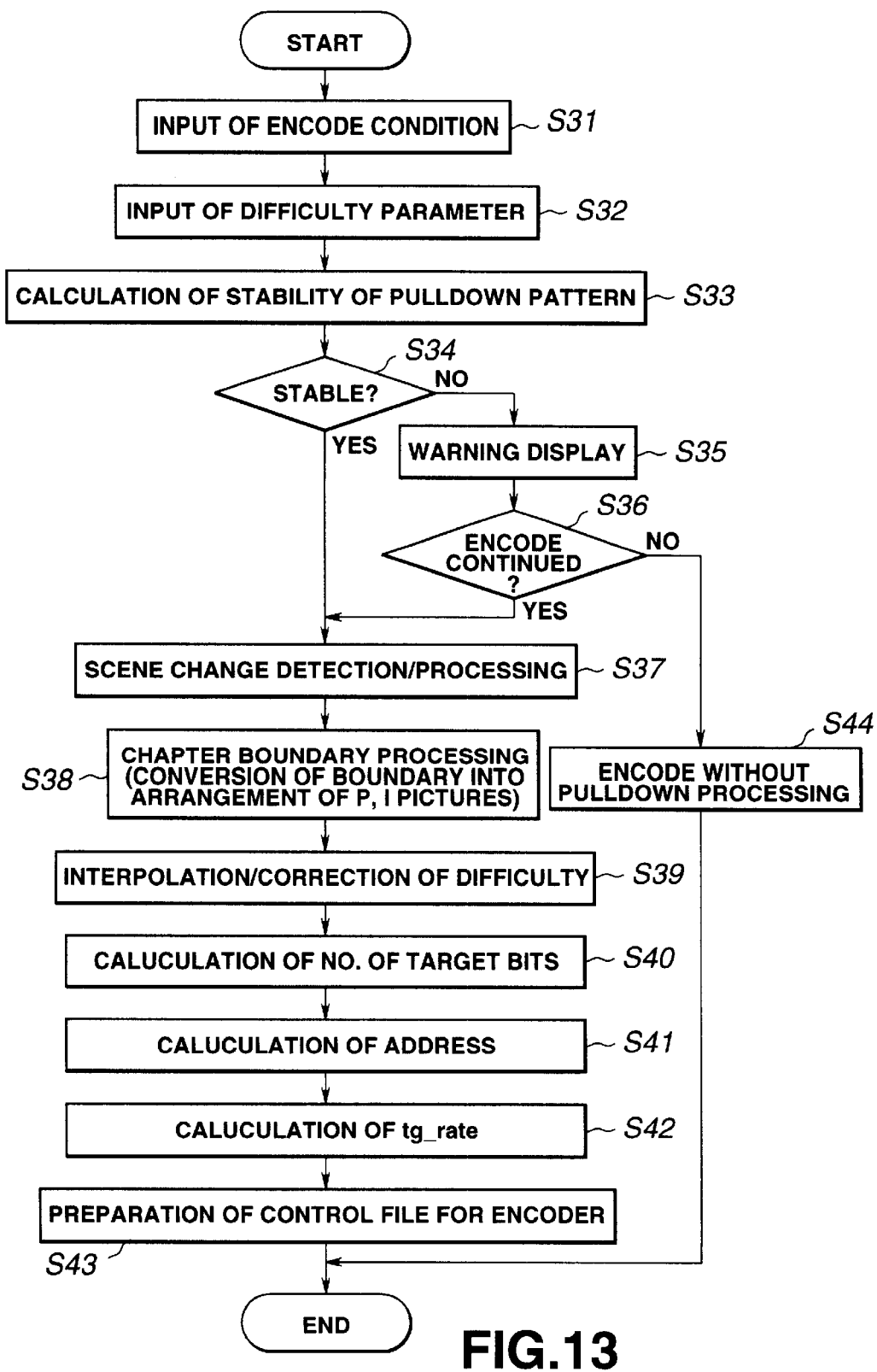
FIG. 13 is a flow chart showing fundamental processing procedure of a video encoding system according to this invention.

FIG. 13 shows fundamental processing procedure of video encode system according to this invention including the above-explained calculation of stability of pull-down pattern.

Initially, at step S31, encode condition is inputted. At step S32, encoding difficulty (Difficulty) parameter is inputted. At step S33, stability of pull-down (Piltdown) of pull-down material is calculated by provisional encode (pre-encode) operation based thereon.

At step S34, the calculated stability of pull-down pattern is judged. In the case where it is not stable, warning is displayed at step S35. At step S36, whether or not encode operation is continued is judged by operator. Further, in the case where the pull-down is judged at the step S36 that processing is continued under the original encode condition, the processing operation proceeds to step S37. On the other hand, in the case where it is judged that the calculated pull-down pattern is stable, the processing operation proceeds to step S37 as it is.

In this example, in the case where it is judged at the step S36 that encode operation is not continued, encode operation without pull-down processing, etc. is carried out at step S44. Thus, video encode processing is completed.

Then, at step S37, detection/processing of scene change is carried out.

At step S38, chapter (CHAPTER) boundary processing to convert boundary into arrangement of P picture, I picture is carried out. At step S39, interpolation/correction processing of encoding difficulty (Difficulty) is carried out. At step S40, the number of target bits (Target bits) is calculated. At step S41, address (ADDRESS) is calculated. At step S42, tg_rate is calculated.

Figure 5:
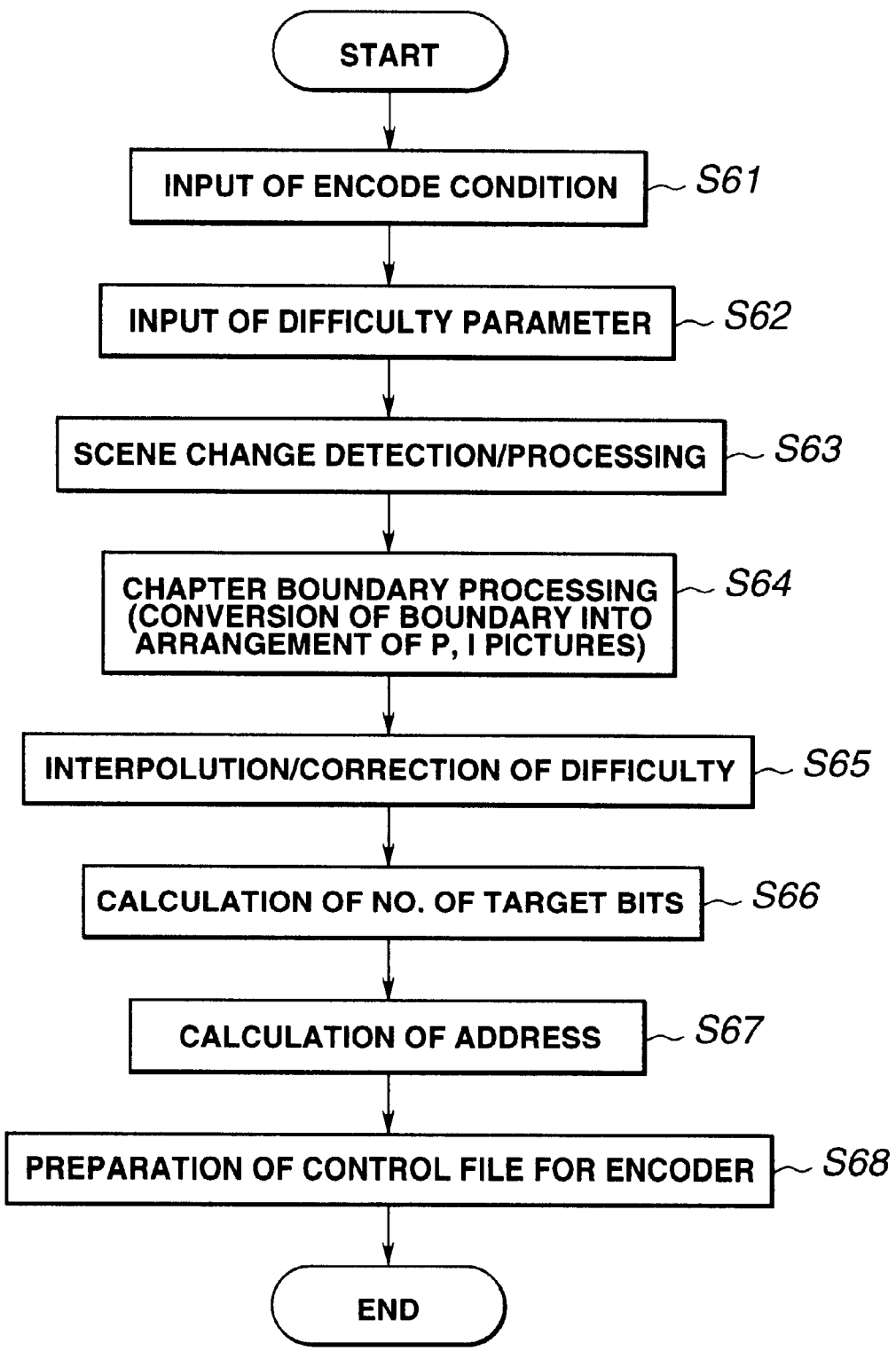
FIG. 5 is a flow chart showing a more practical example of procedure of bit assignment calculation processing.
Figure 6:
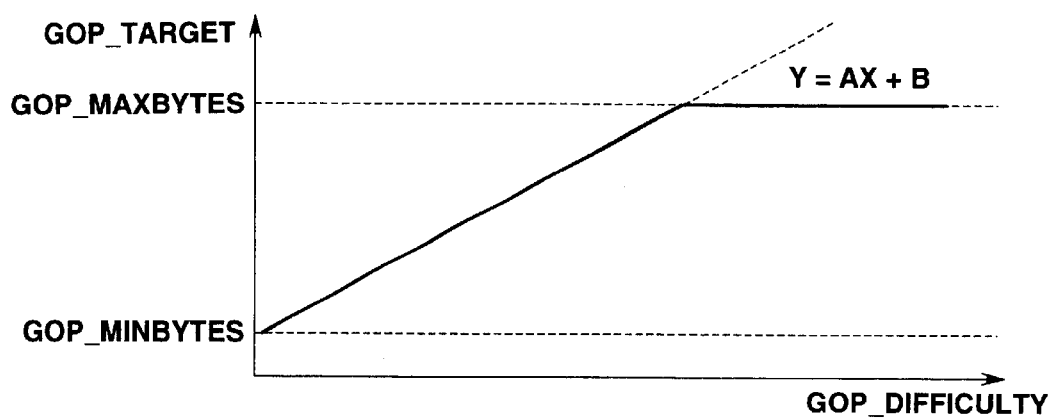
FIG. 6 is a view showing an example of function for converting sum of encoding difficulty every GOP "gop_diff" and bit assignment quantity of GOP unit at the time of encoding "gop_target".
Figure 7:
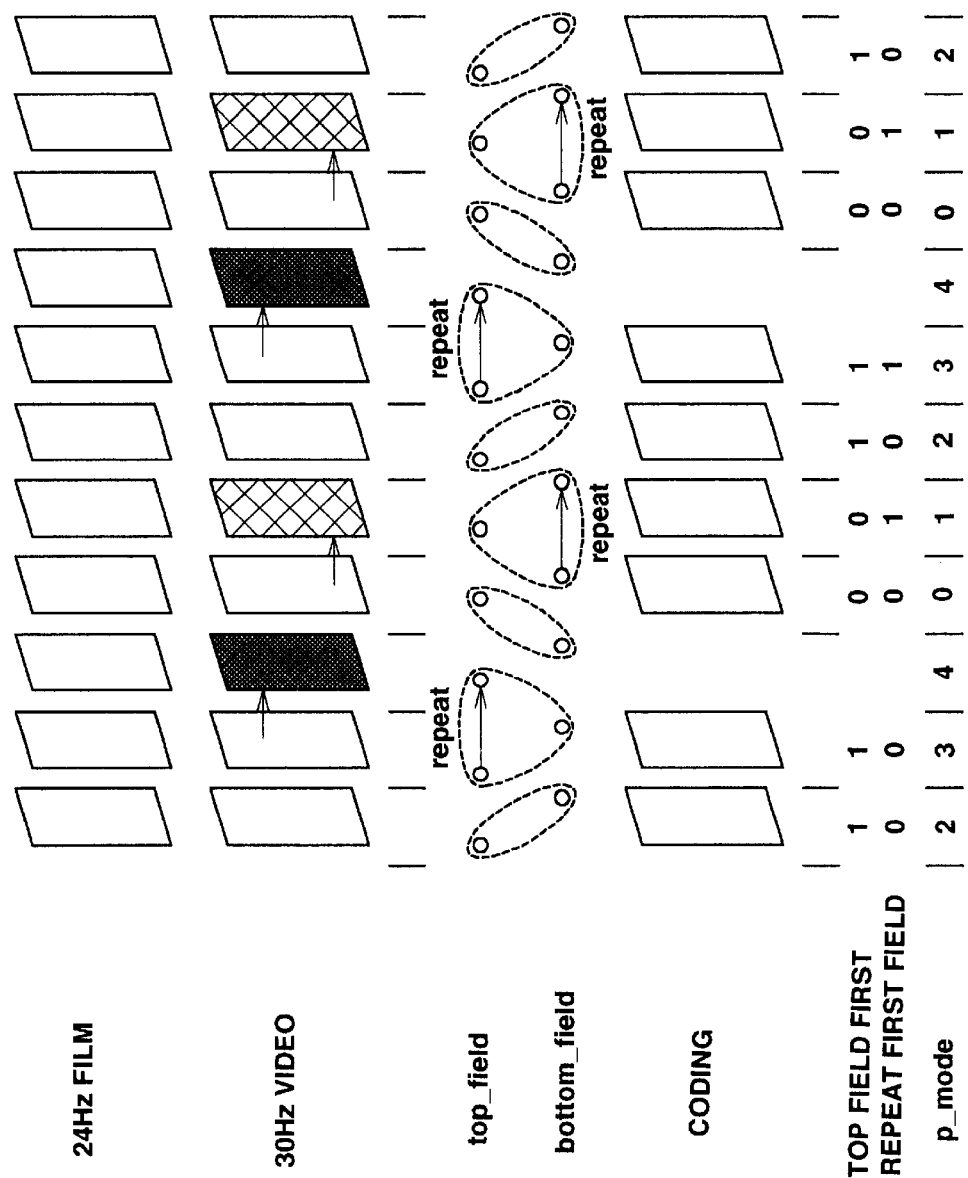
FIG. 7 is a view for explaining 2–3 pull-down conversion.
Figure 8:
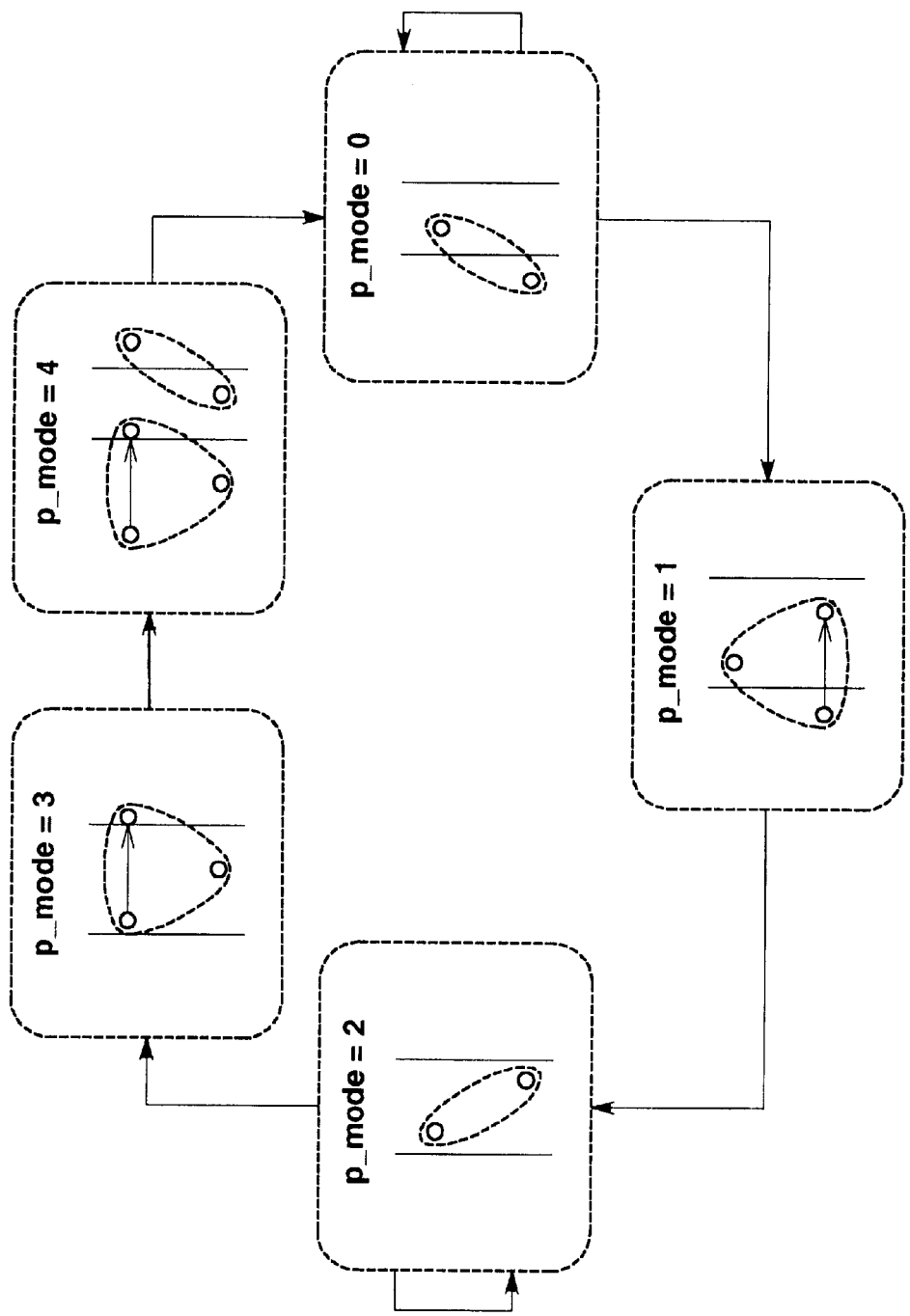
FIG. 8 is a state transition diagram of p_mode[k] in pull-down.

In this example, processing at respective steps from the step S37 to the step S41 can be carried out in a manner similar to the conventional processing procedure shown in FIG. 5.

In addition, at step S43, control file for encoder is prepared. Thus, video encode processing is completed.

The picture encoding apparatus according to this invention will now be described.

Figure 14:
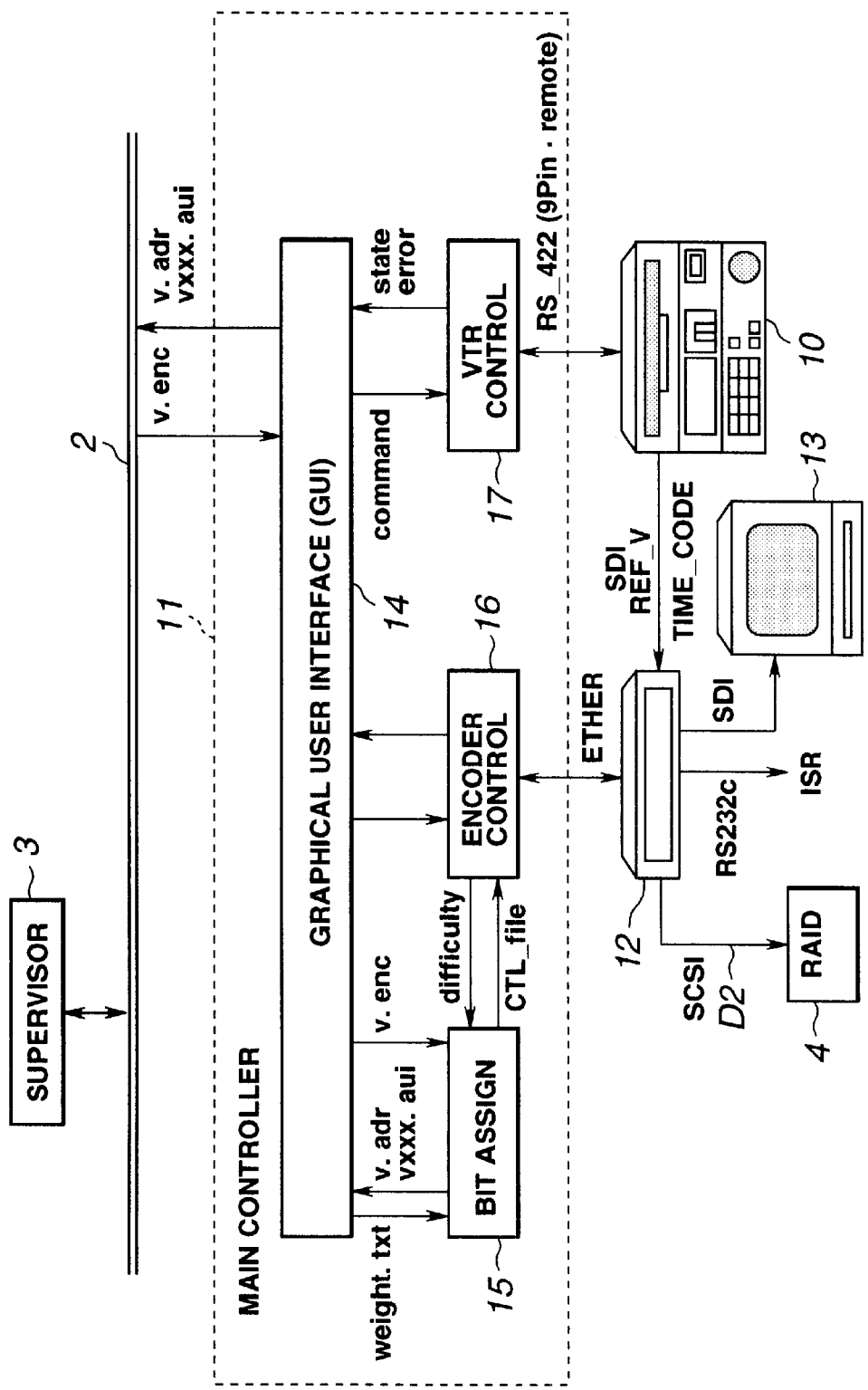
FIG. 14 is a view showing an example of the configuration of video encoding system according to this invention.

FIG. 14 shows an example of the configuration of video encode system as an embodiment of the picture encoding apparatus according to this invention.

This video encode system is the system which can be used so that the above-described picture encoding method according to this invention is applied to compression-encode video information for DID (Digital Versatile Disk, Digital Video Disk) to carry out authoring, etc., and its fundamental configuration can be substantially similar to the configuration of the conventional video encode system shown in FIG. 1.

A main controller 11 is constituted by computer allocated (assigned) to this video encode system to carry out data communication between the main controller 11 and a supervisor 3 connected through a network 2 to control the operation of the entirety of this video encode system.

In more practical sense, the main controller 11 accepts control from the supervisor 3 and accepts operation by operator (not shown) by management of a Graphical User Interface (GUI) section 14 to control the operation of an encoder 12 and a Video Tape Recorder (VTR) 10 by a bit assign section 15, an encoder control section 16 and a VTR control section 17. Thus, the main controller 11 carries out encoding processing of material to be processed in accordance with encode condition notified from the supervisor 3 to notify (inform) its processing result to the supervisor 3. Further, the main controller 11 accepts setting by operator through the GUI section 14 to have ability to change detailed condition of the encoding processing.

In more practical sense, the GUI section 14 of the main controller 11 carries out management of three programs of bit assignment program "BIT_ASSIGN" of the bit assign section 15, encoder control program "CTRL_ENC" of the encoder control section 16 and VTR control program of the VTR control section 17.

Moreover, the bit assign section 15 determines, in frame units, the condition of encoding processing in accordance with encoding file "Vance" notified (informed) from the supervisor 3 to notify (inform), to the control section 16, control data by this condition by file form "C.L. file".

At this time, the bit assign section 15 sets bit assignment in the encoding processing to further change the set condition in accordance with operation by operator. Further, the bit assign section 15 is operative so that when data-compressed video data D2 is recorded onto RAID4 through SCSI, etc., from the encoder 12, it notifies (informs), to the supervisor 3, address data "V.Adm." on the RAID 4 along with information "vxxx.aui" of data quantity necessary for multiplexing processing at the succeeding stage, etc.

The encoder control section 16 controls the operation of the encoder 12 through ether-net ETHER, etc. in accordance with control file "C.L. file" notified (informed) from the bit assign section 15. Further, the encoder control section 16 notifies (informs), to the bit assign section 15, in frame units, data of encoding difficulty "Difficulty" required for encoding processing and notifies (informs), to the bit assign section 15, data "V.Adm." of recording address of the RAID 4 on which video data D2 is recorded and data "vxxx.aui" necessary for later multiplexing processing.

The VTR control section 17 controls the operation of the Video Tape Recorder (VTR) 10 through RS-422 (9pin·remote) in accordance with editing list notified (informed) from the supervisor 3 to reproduce desired material to be edited.

The Video Tape Recorder (VTR) 10 reproduces video data D1 recorded on the magnetic tape in accordance with editing list notified (informed) from the supervisor 3 through the main controller 11 to output, to the encoder 12, "SC.", "REF_V", "TIME_CODE" to be processed. As this VTR 10, digital VTR is ordinarily used.

The encoder 12 switches the operation in accordance with the condition notified (informed) through the main controller 11 from the supervisor 3 to compression-encode video data D1 outputted from the VTR 10 by the technique of MEG (Moving Picture Experts Group).

At this time, the encoder 12 notifies, to the main controller 11, result of encoding processing, and the main controller 11 controls the condition of encoding processing in that data compression to control quantity of bits generated. Thus, the main controller 11 can grasp, in frame units, quantity of bits generated by data compression.

Moreover, at the time of processing of encode condition setting in advance in the 2-pass encoder processing (at the time of provisional encode or pre-encode), the encoder 12 merely data-compresses video data from the VTR 10 to only notify processing result to the main controller 11. On the other hand, at the time of final data compression processing (at the time of main encode processing), the encoder 12 records the compression-processed video data D2 onto the RAID 4 to further notify, to the main controller 11, address where that data is recorded, data quantity and the like.

A monitor unit 13 is caused to be of configuration capable of monitoring video data D2 which has been caused to undergo data compression. In this video encode system, by this monitor unit 13, it is possible to carry out the so-called preview that operator confirms result of data compression processing as occasion demands. Further, operator can operate the main controller 11 on the basis of this preview result to change condition of encoding processing in detail.

In accordance with the picture encoding method and the picture encoding apparatus as explained above, in the case where pull-down processing is designated as the condition of 2-pass variable rate encode processing, it is possible to judge reasonableness of material to be encoded before main encode processing is executed. For this reason, the number of working steps such as review or reconsideration of encode condition taking place in carrying out authoring of DID, etc. can be reduced. Namely, in 2-pass variable rate encode processing by 2–3 pull-down, at the time of pre-encode (provisional encode) processing, stability of pull-down pattern is determined along with measurement of encoding difficulty indicating complex of material to judge reasonableness of encode material before main encode processing. For this reason, it becomes possible to hasten review or reconsideration of the encode condition at early time point.

What is claimed is:

1. A picture encoding method of the 2-pass system for implementing encoding corresponding to pull-down processing to input video material, the method including:

a measurement step of measuring pull-down pattern of the input video material; and a judgement step of judging stability of the measured pull-down pattern, before encode processing, by comparing a matching ratio involving the measured pull-down pattern of the video material with a threshold ratio value and comparing an error occurrence ratio with an error threshold value and by utilizing the comparison results.

2. A picture encoding method as set forth in claim 1, which further includes a display step of displaying whether or not encode processing by pull-down processing of the input video material is suitable on the basis of judgment result at the judgment step.

3. A picture encoding method as set forth in claim 1, wherein the judgement step further includes a selection step of comparing the measured pull-down pattern and respective pull-down patterns based on assumed plural initial phases to select initial phase which provides pull-down pattern closest to the measured pull-down pattern of the respective pull-down patterns, and an error calculation step of calculating error with respect to total number of frames of the video material of the pull-down pattern based on the selected initial phase.

4. A picture encoding method as set forth in claim 1, wherein encoding processing corresponding to the pull-down processing is carried out without carrying out encoding of repetitive fields in accordance with the measured pull-down pattern.

5. A picture encoding apparatus of the 2-pass system adapted for implementing encoding processing based on pull-down pattern to input video material, the apparatus including:

measuring means for measuring pull-down pattern of the input video material;

selector means for comparing the measured pull-down pattern and respective pull-down patterns based on assumed initial phases to select initial phase which provides pull-down pattern closest to the measured pull-down pattern of the respective pull-down patterns; and stability judging means for judging, before encode processing, stability of the pull-down pattern by comparing a matching ratio between the measured pull-down pattern of the video material with a threshold ratio value and comparing an error occurrence ratio with an error threshold value and by utilizing the comparison results.

6. A picture encoding apparatus as set forth in claim 5, which further includes display means for displaying whether or not encode processing by pull-down processing of the input video material is suitable on the basis of judgment result at the stability judging means.

7. A picture encoding apparatus as set forth in claim 5, further including error calculating means for calculatino error with respect to total number of frames of the video material of the pull-down pattern based on the selected initial phase.

* * * * *